US010661767B2

(12) United States Patent
Koch et al.

(10) Patent No.: US 10,661,767 B2
(45) Date of Patent: May 26, 2020

(54) METHOD FOR ACTUATING A HYDRAULIC BRAKE SYSTEM IN A MOTOR VEHICLE

(71) Applicant: Robert Bosch GmbH, Stuttgart (DE)

(72) Inventors: Matthaeus Koch, Talheim (DE); Rolf Gawlik, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 101 days.

(21) Appl. No.: 15/781,646

(22) PCT Filed: Oct. 12, 2016

(86) PCT No.: PCT/EP2016/074477
§ 371 (c)(1),
(2) Date: Jun. 5, 2018

(87) PCT Pub. No.: WO2017/097467
PCT Pub. Date: Jun. 15, 2017

(65) Prior Publication Data
US 2018/0354477 A1 Dec. 13, 2018

(30) Foreign Application Priority Data
Dec. 9, 2015 (DE) ........................ 10 2015 224 711

(51) Int. Cl.
*B60T 8/1755* (2006.01)
(52) U.S. Cl.
CPC ...... *B60T 8/17551* (2013.01); *B60T 8/17557* (2013.01); *B60T 2201/081* (2013.01); *B60T 2201/083* (2013.01); *B60T 2201/089* (2013.01)

(58) Field of Classification Search
CPC ............. B60T 8/17551; B60T 8/17557; B60T 2201/089; B60T 2201/083; B60T 2201/081
See application file for complete search history.

(56) References Cited

U.S. PATENT DOCUMENTS

| 5,265,946 A * | 11/1993 | Bader ..................... B60T 8/172 303/146 |
| 5,301,617 A * | 4/1994 | Miwa ....................... B60T 7/18 180/168 |
| 8,798,841 B1 | 8/2014 | Nickolaou et al. |
| 2012/0072073 A1 * | 3/2012 | Groitzsch ............... B60T 8/172 701/41 |
| 2012/0143454 A1 * | 6/2012 | Groitzsch ............... B60T 8/172 701/70 |

(Continued)

FOREIGN PATENT DOCUMENTS

| DE | 10316413 A1 | 10/2004 |
| JP | 2010030423 A | 2/2010 |

(Continued)

OTHER PUBLICATIONS

International Search Report for PCT/EP2016/074477, dated Feb. 3, 2017.

*Primary Examiner* — Russell Frejd
(74) *Attorney, Agent, or Firm* — Norton Rose Fulbright US LLP; Gerard Messina

(57) ABSTRACT

A method for actuating a hydraulic brake system in a motor vehicle, in which a hydraulic brake pressure is generated specific to the wheel, data of a driving environment sensor system being taken into account for detecting the instantaneous lateral distance of the motor vehicle from the desired track.

20 Claims, 1 Drawing Sheet

(56) References Cited

U.S. PATENT DOCUMENTS

2014/0136015 A1    5/2014  Hayakawa et al.
2015/0308836 A1*  10/2015  Alvarez Tabio Togores .............. G09B 29/106
                                                                    701/400
2015/0321668 A1   11/2015  Elwart et al.

FOREIGN PATENT DOCUMENTS

JP    2012076621 A    4/2012
JP    2015063245 A    4/2015

* cited by examiner

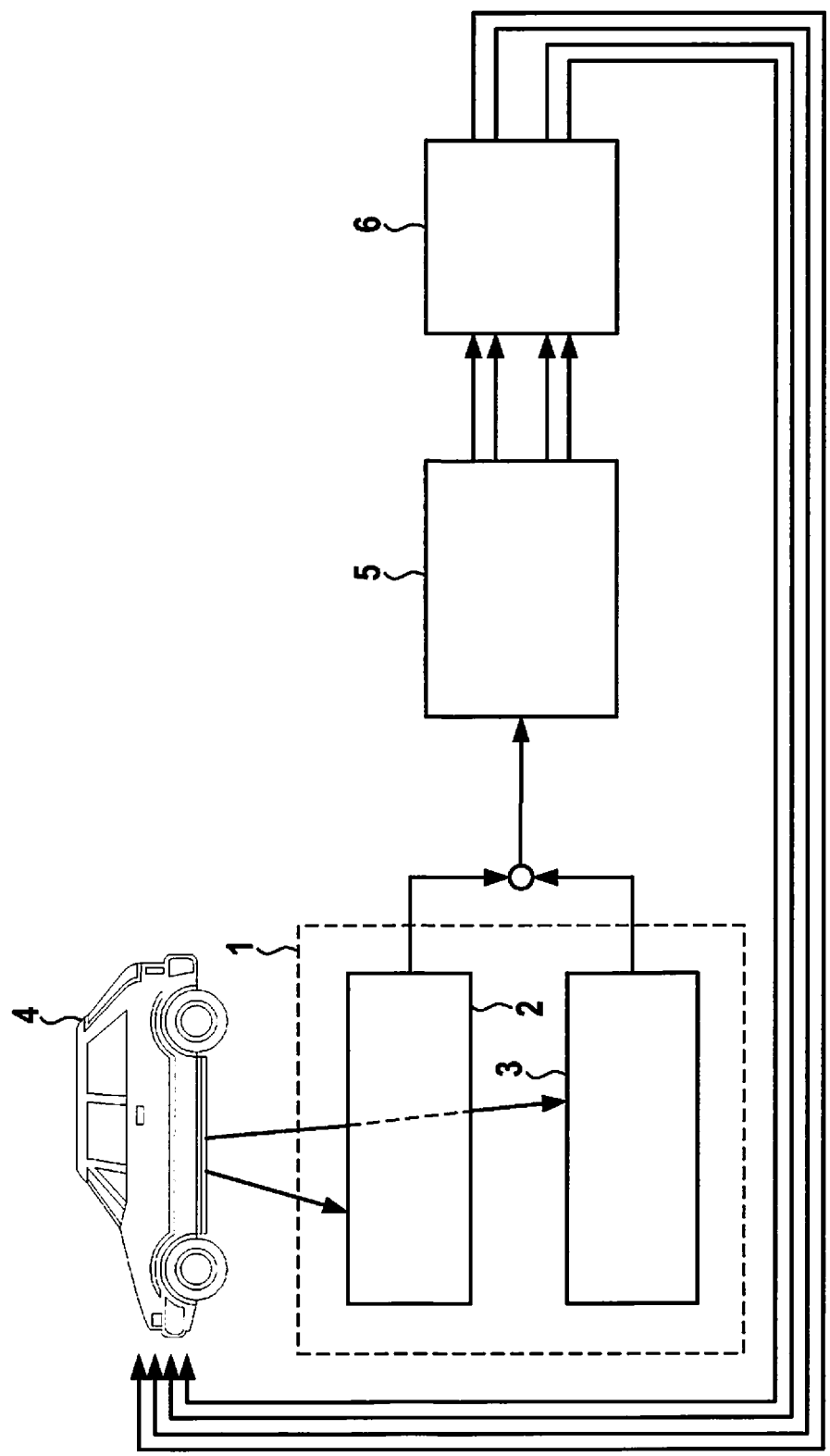

METHOD FOR ACTUATING A HYDRAULIC BRAKE SYSTEM IN A MOTOR VEHICLE

FIELD OF THE INVENTION

The present invention relates to a method for actuating a hydraulic brake system in a motor vehicle.

BACKGROUND INFORMATION

Hydraulic brake systems in motor vehicles are believed to be understood which are equipped with an anti-lock braking system to prevent one or more wheels of the motor vehicle from locking during a braking procedure. In so doing, the speed of the wheels is detected by sensors and the brake pressure at one wheel is reduced if the wheel speed of the wheel in question falls disproportionately in relation to the other wheels.

Electronic stability programs are also familiar, which automatically modulate the brake pressure in the brake system based on information concerning the longitudinal and transverse dynamics of the vehicle ascertained by sensors. Both in the case of antilock braking systems and in the case of electronic stability programs, the maintenance of a stable operating behavior is paramount.

SUMMARY OF THE INVENTION

With the aid of the method according to the present invention, a hydraulic brake system in a motor vehicle may be actuated in a way that the motor vehicle follows a desired track with high reliability. In particular, the desired track is predetermined by the course of the road, e.g., via information from a navigation system in the vehicle and/or from the setpoint distance to a lateral edge of the roadway. In the method, the motor vehicle is kept stable in the desired track during a braking procedure, in particular, an unwanted sideward swerve or a skewed position of the vehicle relative to the vehicle motion being avoided during the braking procedure.

The hydraulic brake system in the motor vehicle is implemented in a manner that the hydraulic brake pressure may be adjusted specific to the wheel in each brake unit per vehicle wheel. In so doing, the brake pressure in the brake units of the vehicle wheels may be modulated in a manner that without increase of brake pressure, the wheel-brake pressure is merely lowered individually. However, if necessary, with the aid of a hydraulic pump, the wheel-brake pressure may also be modulated in a way that a brake-pressure increase may be realized, as well.

The hydraulic brake system is actuated in a controlled process. The brake system is assigned a sensor system, via which data concerning the longitudinal and/or transverse dynamics of the motor vehicle are ascertained. Based on the ascertained data, controller signals are generated by which, in particular, intake and discharge valves in the hydraulic brake system are driven in order to modulate pressure.

The sensor system, via which information is determined concerning the longitudinal or transverse dynamics of the vehicle, which may include wheel-speed sensors as well as possibly acceleration sensors, especially to determine the lateral acceleration, and/or a steering-angle sensor for determining the instantaneous steering-wheel angle and/or a yaw-angle sensor to determine the instantaneous yaw angle or yaw rate of the vehicle.

In the method according to the present invention, additionally data of a driving environment sensor system in the vehicle are drawn upon, with which the instantaneous lateral distance of the motor vehicle from the desired track may be ascertained. This makes it possible to detect vehicle positions and situations in which although the vehicle is traveling in the middle of the desired track during a braking procedure, it is moving back and forth with a changing sideslip angle relative to the desired track. In a further driving situation, which may occur during a braking procedure, the vehicle pitches during initial braking and rotates slightly to the side, whereupon the vehicle leaves the desired track with a value of the yaw rate equal to zero.

This driving situation may be detected via the driving environment sensor system, by determining the instantaneous lateral departure of the motor vehicle from the desired track. The wheel-specific brake pressure may be adjusted, taking into account the instantaneous lateral distance relative to the desired track, so that it is possible to prevent the aforesaid driving situations, or at least to reduce the extent of the deviations from the desired track. The consideration of the data of the driving environment sensor system thus improves the driving stability during a braking procedure.

According to one advantageous embodiment, the method for actuating the hydraulic brake system is carried out when the motor vehicle is driving straight ahead. During straight-ahead driving, the setpoint values for the steering-wheel angle and the yaw rate are equal to zero. However, it is also possible to carry out the braking method according to the present invention during cornering, especially when driving through a curve with constant radius of curve, possibly also in the case of non-constant curvature. In each case, the data from the driving environment sensor system are utilized to detect the instantaneous lateral distance of the motor vehicle from the desired track for the vehicle stabilization.

For example, the driving environment sensor system includes video sensors and/or radar sensors. The data gathered by the driving environment sensor system are supplied in the vehicle to a regulating or control unit, in which the data are evaluated, and based on the data, actuating signals are generated to drive one or more actuators, especially to drive intake and/or discharge valves of the hydraulic brake system. In addition, the data of the sensor system for determining the longitudinal and/or transverse dynamics of the motor vehicle are processed in the regulating or control unit.

According to a further expedient refinement, only a brake-pressure reduction is implemented in adjusting the wheel-specific brake pressure. This procedure has the advantage that, in particular, the instantaneous initial brake pressure in the brake master cylinder of the brake system is sufficient, and no pressure increase must be implemented relative to this pressure, so that no additional hydraulic pump for increasing the pressure is necessary, either. Rather, the brake pressure is adjusted by a brake-pressure reduction at one or more wheel-brake units of the different vehicle wheels.

In an alternative embodiment, it is also possible to implement a brake-pressure control above the initial brake pressure in the brake master cylinder of the brake system. For this, in particular, an additional hydraulic pump, e.g., the hydraulic pump of an electronic stability program in the brake system, is driven. It is therefore possible to carry out the wheel-specific adjustment for the vehicle stabilization both via an increase and via a lowering of the wheel-specific brake pressure.

The various method steps for actuating the hydraulic brake system are carried out via the regulating or control unit which, if desired, may be part of the hydraulic brake system.

Additional advantages and useful embodiments may be gathered from the further claims, the FIGURE description and the drawing.

BRIEF DESCRIPTION OF THE DRAWING

The FIGURE shows in schematic manner the operational sequence for actuating a hydraulic brake system in a motor vehicle.

DETAILED DESCRIPTION

A first block 1 includes desired behavior 2 and actual behavior 3 of a motor vehicle 4 as sub-blocks. Desired behavior 2 includes various information in the vehicle with which the instantaneous desired track of the vehicle is determined and, in addition, the driver input is ascertained. This information may be ascertained via a sensor system in the vehicle; for example, the desired track of the vehicle may be determined with the aid of a driving environment sensor system, which may include radar sensors and/or video sensors. The lateral distance of the motor vehicle from a lateral edge of the roadway, for example, is ascertained with the aid of the driving environment sensor system.

With knowledge of the lateral distance from the edge of the roadway, the desired track may be determined, for example, via a defined setpoint distance to the lateral edge of the roadway.

Additionally or alternatively, the desired track may also be determined from information of a navigation system carried along in the vehicle, in which, in addition, a road map is stored. The actual position of the vehicle as well as the desired track may be determined from this data.

For the present method for actuating a hydraulic brake system with which motor vehicle 4 is decelerated, both straight and curved desired tracks come into consideration.

The driver input, especially as regards the steering activity and the actuation of the brake pedal, may possibly also be determined via a sensor system carried along in the vehicle.

The actual behavior of sub-block 3 is ascertained with the aid of the sensor system, carried along in the vehicle, for determining the longitudinal and/or transverse dynamics of motor vehicle 4. In so doing, for example, the wheel speeds, the lateral acceleration and the yaw rate are determined via the sensor system. The actual behavior of motor vehicle 4 may also be determined via the ascertainment of the steering angle, by determining acceleration values, for example, especially in the transverse direction, taking the steering angle as a basis.

In addition, information about the instantaneous state of the hydraulic brake system in the vehicle, especially about the wheel-specific brake pressure at the different wheel-brake units of the wheels, is also available via the sensor system present in the vehicle.

When executing a braking procedure, the wheel-brake units at the wheels are controlled in a manner specific to the wheel, in order to improve the driving stability of motor vehicle 4 or to avoid driving instabilities. In so doing, the information from desired behavior 2 and actual behavior 3 is processed in a controller 5, in which actuator signals are generated for driving an actuator system 6 of the hydraulic brake system, particularly the intake and discharge valves.

In order to keep motor vehicle 4 stable during a braking procedure, and in particular, to prevent a sideward swerve from the desired track, first of all, the data of the sensor system for the longitudinal and/or transverse dynamics of the motor vehicle are utilized, especially lateral-acceleration values from wheel-speed sensors, a lateral-acceleration sensor and a steering-angle sensor. Secondly, the information of the driving environment sensor system having the radar and video sensors is also utilized, via which a lateral departure of the actual position of motor vehicle 4 from a desired track may be determined. In this way, it is possible to avoid or at least to minimize a sideward swerve of the vehicle upon initiation of a braking procedure or a repeated movement of the vehicle back and forth about the desired track accompanied in each case by a slight rotational movement about the vertical vehicle axis.

What is claimed is:

1. A method for actuating a hydraulic brake system in a motor vehicle, the motor vehicle including wheels, the method comprising:
    generating a wheel-specific hydraulic brake pressure for each of the wheels of the motor vehicle; and
    adjusting the wheel-specific brake pressure for each of the wheels as a function of data concerning the longitudinal and/or transverse dynamics of the motor vehicle ascertained by sensors, to guide the motor vehicle in a desired track, wherein data from a driving environment sensor system for detecting the instantaneous lateral distance of the motor vehicle from the desired track is taken into account in the adjusting of the wheel-specific brake pressure;
    wherein the data concerning the longitudinal and/or transverse dynamics of the motor vehicle include vehicle lateral acceleration values.

2. The method of claim 1, wherein the method is performed during straight-ahead driving of the motor vehicle.

3. The method of claim 1, wherein the driving environment sensor system for determining the instantaneous lateral distance of the motor vehicle from the desired track includes video sensors.

4. The method of claim 1, wherein the driving environment sensor system for determining the instantaneous lateral distance of the motor vehicle from the desired track includes radar sensors.

5. The method of claim 1, wherein only a brake-pressure reduction is implemented in adjusting the wheel-specific brake pressure.

6. The method of claim 1, wherein the method is implemented with a brake-pressure control below the initial brake pressure in a brake master cylinder of the brake system.

7. The method of claim 1, wherein the method is implemented with a brake-pressure control above the initial brake pressure in a brake master cylinder of the brake system.

8. The method of claim 1, wherein the desired track is determined from the information of a navigation system.

9. The method of claim 1, wherein the desired track is determined from the lateral distance of the motor vehicle to a lateral edge of the roadway.

10. The method as recited in claim 1, wherein the generating and the adjusting occur during cornering by the motor vehicle.

11. The method as recited in claim 1, wherein the sensors include wheel speed sensors, a lateral acceleration sensor, and a steering-angle sensor, and the data concerning the longitudinal and/or transverse dynamics of the motor vehicle include data ascertained by the wheel speed sensors, data ascertained by the lateral acceleration sensor, and data ascertained by the steering-angle sensor.

12. The method as recited in claim 1, further comprising: determining the desired track from a stored road map.

13. A regulating unit for actuating a hydraulic brake system in a motor vehicle, the motor vehicle including wheels, the regulating unit comprising:
a control device configured to perform the following:
generating a wheel-specific hydraulic brake pressure to for each of the wheels of the motor vehicle; and
adjusting the wheel-specific brake pressure for each of the wheels as a function of data concerning the longitudinal and/or transverse dynamics of the motor vehicle ascertained by sensors, to guide the motor vehicle in a desired track, wherein data from a driving environment sensor system for detecting the instantaneous lateral distance of the motor vehicle from the desired track is taken into account in the adjusting of the wheel-specific brake pressure;
wherein the data concerning the longitudinal and/or transverse dynamics of the motor vehicle include vehicle lateral acceleration values.

14. The regulating unit as recited in claim 13, wherein the generating and the adjusting occur during cornering by the motor vehicle.

15. The regulating unit as recited in claim 13, wherein the sensors include wheel speed sensors, a lateral acceleration sensor, and a steering-angle sensor, and the data concerning the longitudinal and/or transverse dynamics of the motor vehicle include data ascertained by the wheel speed sensors, data ascertained by the lateral acceleration sensor, and data ascertained by the steering-angle sensor.

16. The regulating unit as recited in claim 13, wherein the desired track is determined from a stored road map.

17. A brake system in a vehicle, comprising:
regulating unit for actuating a hydraulic brake system in a motor vehicle, the motor vehicle including wheels, the regulating unit including a control device configured to perform the following:
generating a wheel-specific hydraulic brake pressure for each of the wheels of the motor vehicle; and
adjusting the wheel-specific brake pressure for each of the wheels as a function of data concerning the longitudinal and/or transverse dynamics of the motor vehicle ascertained by sensors, to guide the motor vehicle in a desired track, wherein data from a driving environment sensor system for detecting the instantaneous lateral distance of the motor vehicle from the desired track is taken into account in the adjusting of the wheel-specific brake pressure;
wherein the data concerning the longitudinal and/or transverse dynamics of the motor vehicle include vehicle lateral acceleration values.

18. The brake system as recited in claim 17, wherein the generating and the adjusting occur during cornering by the motor vehicle.

19. The brake system as recited in claim 17, wherein the sensors include wheel speed sensors, a lateral acceleration sensor, and a steering-angle sensor, and the data concerning the longitudinal and/or transverse dynamics of the motor vehicle include data ascertained by the wheel speed sensors, data ascertained by the lateral acceleration sensor, and data ascertained by the steering-angle sensor.

20. The brake system as recited in claim 17, wherein the desired track is determined from a stored road map.

* * * * *